United States Patent [19]

Herzog

[11] 4,264,827
[45] Apr. 28, 1981

[54] CURRENT MODE DATA OR POWER BUS

[75] Inventor: Hans K. Herzog, Bellevue, Wash.

[73] Assignee: The Boeing Company, Seattle, Wash.

[21] Appl. No.: 957,746

[22] Filed: Nov. 6, 1978

[51] Int. Cl.³ .......................... H02J 3/00; H01P 5/12
[52] U.S. Cl. ...................................... 307/17; 333/100; 336/73
[58] Field of Search ............................. 301/17, 89–91; 336/175, 73; 333/10, 6, 100; 365/69

[56] References Cited

U.S. PATENT DOCUMENTS

| | | |
|---|---|---|
| 791,656 | 6/1905 | Shreeve . |
| 890,850 | 6/1908 | Duo . |
| 1,173,094 | 2/1916 | Blume . |
| 1,504,882 | 8/1924 | Elmen . |
| 1,865,430 | 7/1932 | Borkent . |
| 2,672,584 | 3/1954 | Rolf ........................................ 321/12 |
| 3,105,961 | 10/1963 | Warman ............................ 365/69 X |
| 3,568,035 | 3/1971 | Pierson ................................. 321/15 |
| 3,569,833 | 3/1971 | Milton ................................... 325/26 |
| 3,651,454 | 3/1972 | Venema et al. .................... 340/52 F |
| 3,742,408 | 6/1973 | Jaeger ..................................... 336/5 |

OTHER PUBLICATIONS

"Aircraft Internal Time Division Command/Response Multiplex Data Bus", Military Standard MIL-STD-1553B, U.S. Dept. of Defense, Sep. 21, 1978.
"Mark 33 Digital Information Transfer System (DITS), " Arinc Specification 429-1, Heronautical Radio, Inc., Jun. 1, 1978.

Primary Examiner—Joseph W. Hartary
Assistant Examiner—W. J. Brady
Attorney, Agent, or Firm—Christensen, O'Connor, Johnson & Kindness

[57] ABSTRACT

A current mode data or power bus which provides communication between two or more terminal devices over a common, single-channel medium. The data bus comprises a pair of wires, twisted to form a succession of loops and short-circuited at both ends, together with an arbitrary number of bus couplers, one for each terminal. The bus couplers are formed by separate, disengageable core elements. Each bus coupler is inductively coupled to the twisted wire pair by inserting one or more core legs of the bus coupler through adjacent loops in the twisted wire pair; each wire loop around a core leg then constituting a one-turn transformer winding of the coupler. In this manner, separate terminals can be readily coupled to or decoupled from the current mode data communication bus without the need for making spliced, galvanic connections. This bus configuration is readily adaptable to single or multiphase power transmission. And, in either case, the bus configuration provides excellent electromagnetic interference rejection properties.

8 Claims, 8 Drawing Figures

CURRENT MODE DATA OR POWER BUS

BACKGROUND OF THE INVENTION

The present invention relates to electrical transmission systems and in particular to busses for data communication or power transmission among physically separated terminals.

Present day electrical communication systems often comprise a number of interrelated but physically separated subsystems. Data communication among these subsystems is generally accomplished by means of a data bus. In particular, modern avionic system designs are predicated on the use of a data bus network for data communication among the physically separated subsystems comprising flight and navigational avionic and flight controls.

In the aviation industry, two data communication bus approaches are currently in widespread use. The broadcast bus currently in use in many commercial aviation applications assigns one data bus exclusively to one data source terminal. Data emanating from that single transmitter can then be picked up by any number of receiver terminals. Since avionic systems may include forty or more remote subsystems, located along both the wings and the fuselage, the amount of wiring (and attendant installation and maintenance costs) can be extensive. To significantly reduce the required amount of bus wiring, and wiring connections, many military applications specify the use of a multiplex data bus approach. This approach is based on the use of a central bus controller terminal which has supreme authority over the bus as well as over all remote terminals. The remote terminals are coupled to a single main data bus, with access thereto determined by the bus controller (under software control). This multiplex data bus approach significantly reduces the wiring requirements of an avionic system, with an attendant decrease in weight and cost and an increase in reliability.

The multiplex data bus approach currently employs a voltage mode data bus, i.e., data is communicated in terms of voltage levels appearing on a main data bus. The use of the voltage mode requires that galvanic connections be made to the main data bus; thus, a remote terminal is coupled to the data bus by means of a splice connection. For example, U.S. Pat. No. 3,651,454 discloses a bus coupler which, on installation, drives two sharp contact prongs through the insulation of the bus and into the conductor strands, establishing an electrical connection.

While being generally practical and reliable, the voltage mode data bus does have some disadvantages, particularly in applications within the aviation industry. Aging and vibration may cause the contact properties at the remote terminal splice connections to deteriorate. Also, decoupling a remote terminal from the main data bus requires that the coupling electrical connection be neutralized. These disadvantages are of particular concern in the commercial aviation industry where remote avionic subsystems may be introduced or replaced throughout the commercial life of an airplane, and where reliability is of paramount importance.

SUMMARY OF THE INVENTION

A general object of the present invention is to provide a current mode, single-channel data or power communication system for data or power communication among two or more physically separated terminals.

A further object of the present invention is to provide such a current mode bus which allows terminals to be coupled thereto and/or decoupled therefrom with a minimum of effort and cost.

Another object of the present invention is to provide such a current mode data bus which can use wire, insulation and coupling materials able to maintain reliability under a large range of operating temperatures, air density and humidity.

Yet another object of the present invention is to provide such a current mode bus having favorable electromagnetic compatibility characteristics, i.e., the operation of the bus must not affect nor be affected by other electrical or electronic equipment, radiation, or inductive or capacitive coupling.

A still further object of the present invention is to provide such a current mode bus for an airplane which can operate without interruption during lesser lightning strikes in the airplane and which will not sustain damage or cause damage to remote avionic subsystem hardware due to heavy lightning strikes.

Still another object of the present invention is to provide such a current mode bus which is insensitive to the operational status (active, inactive or decoupled from the data bus system) of any of the coupled terminals.

To accomplish these and other objects, the present invention provides a current mode data bus comprising a pair of wires, twisted to form a succession of wire loops, and coupled together at both ends in a short-circuit termination, together with a transformer-type bus coupler with a disengageable core element for each terminal. A particular bus coupler can be of any convenient, conventional core configuration which can be formed of separate, disengageable core elements, together with conventional potting, jacketing and shielding. For example, a U-I core configuration can be used with an I-shaped core element separate and disengageable from a U-shaped core element. A terminal winding on one of the core elements provides an inductive coupling to the stub connection of as associated terminal.

In order to couple a terminal into the current mode data bus, its disassembled bus coupler is inductively coupled to the twisted wire pair with, at least, one core leg extending through one of the loops therein. The bus coupler is then assembled to complete the inductive coupling of the terminal to the current mode data bus, with each wire loop constituting a one-turn transformer winding. Decoupling a terminal from the current mode data bus is readily accomplished in a procedure the reverse of the above.

The novel features believed to be characteristic of the present invention are set forth in particularity in the appended claims. However, a more complete appreciation of the present invention, both as to organization and mode of operation, and the attendant advantages thereof, will result as the same becomes better understood by reference to the following detailed description of a preferred embodiment when considered in conjunction with the accompanying drawings.

BRIEF DESCRIPTION OF THE DRAWINGS

FIG. 2a shows portions of a twisted wire pair of the current mode data bus together with a U-I configuration transformer coupler according to the present invention.

FIG. 2b shows the U-I configuration transformer coupler in FIG. 2a shielded and with separate core elements clamped together.

DESCRIPTION OF THE PREFERRED EMBODIMENT

Figure 1:
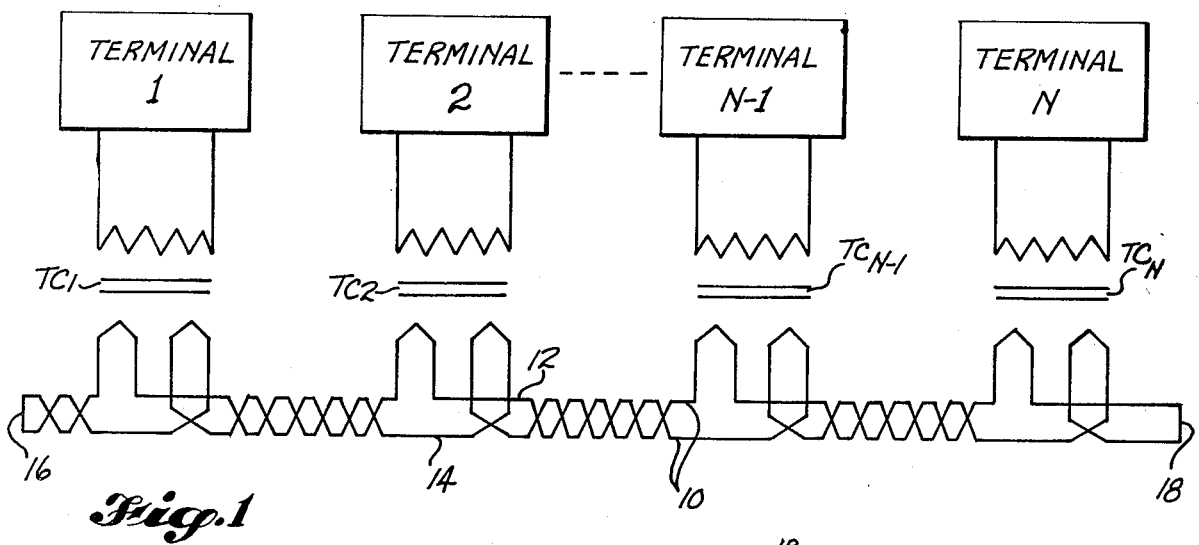
FIG. 1 is a schemtaic electrical equivalent of the current mode data bus according to the present invention.

Referring now to the drawings wherein like reference characters designate like or corresponding elements throughout the several views, in terms of the schematic representation in FIG. 1, it is desired to provide a data bus communication system for N physically separated terminals, with the number of such terminals N being arbitrarily variable. These N terminals are denominated 1, 2, . . ., N-1, and N. (While the ensuing detailed description of a preferred embodiment is in terms of a current mode data bus, those skilled in the art will recognize a current mode power bus for transmitting single-phase power to one or more power terminals.)

FIG. 1 depicts a pair of insulated wires 12 and 14 which are twisted to form a succession of loops comprising a twisted wire pair 10. Twisted wire pair 10 is terminated at both ends by short-circuit splices 16 and 18 to form a continuous current loop bus medium. Bus couplers (indicated schematically as TC$_1$, TC$_2$, . . . TC$_{N-1}$, and TC$_N$) are provided to inductively couple each of the N terminals to twisted wire pair 10, forming a current mode data communication system. Thus, the current mode data bus is comprised of a bus medium, i.e., twisted wire pair 10, and a number of bus couplers, at least one for each terminal.

In a preferred embodiment of the current mode data bus, each bus coupler includes a magnetically permeable core which consists of an assembly of separate core elements, and also includes a terminal winding on the core which is adapted to be coupled to a terminal stub of an associated terminal. To provide inductive coupling between the terminal and the bus medium (twisted wire pair 10) the separable core elements are disassembled and at least one of the core elements is coupled to the bus medium so that the bus medium forms at least one loop around the core element. The core elements are then reassembled to complete the inductive coupling. In this manner, terminals can be coupled to and decoupled from the bus medium (twisted wire pair 10) of the current mode data bus with no alteration to the structural integrity of the bus medium. Accordingly, since no galvanic contacts are required, extreme reliability claims can be made for twisted wire pair 10.

Figure 2C:
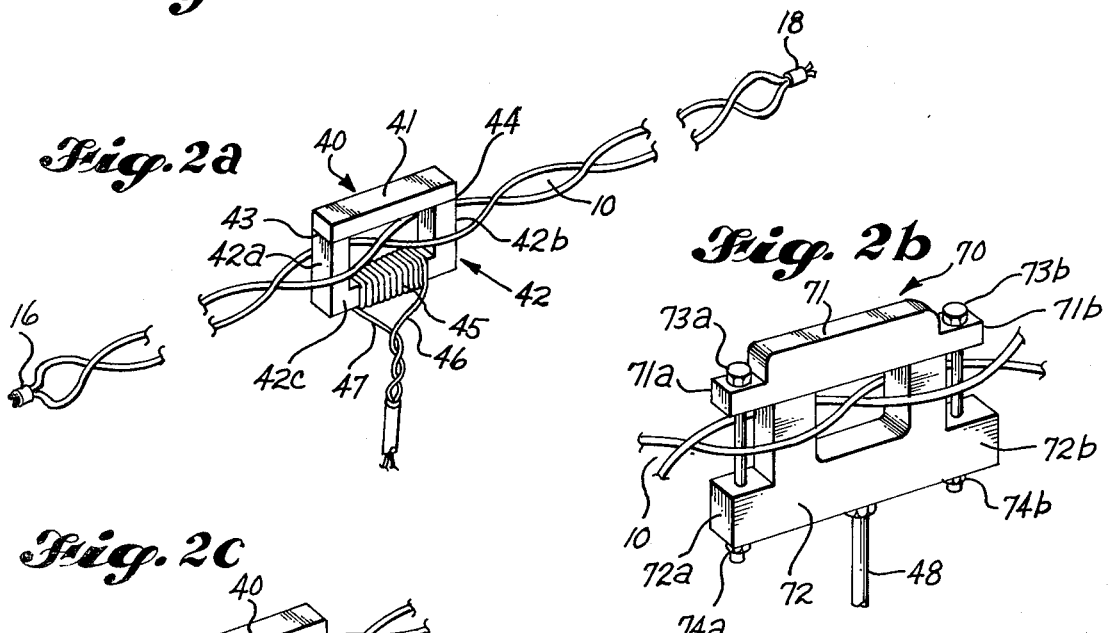
FIG. 2c shows the U-I configuration transformer coupler in FIG. 1 with a dual terminal winding.

Since, in the preferred and alternate embodiments of the present invention, each of the bus couplers for the terminals is identical, the ensuing detailed description is with respect to only one such bus coupler for each embodiment. Referring then to FIG. 2a, portions of wisted wire pair 10 are shown together with short-circuit splice terminations 16 and 18. A bus coupler 40 comprises a U-I core formed by an I-shaped core element 41 and a U-shaped core element 42. Bus coupler 40 is inductively coupled to the bus medium by extending legs 42a and 42b of the U-shaped core element through adjacent loops of twisted wire pair 10. The I-shaped core element is then attached to the U-shaped core element in a conventional manner, completing the assembly of the U-I core. This coupling implementation results in each wire of twisted wire pair 10 constituting one turn (for a total of two turns) of a winding on the U-I core of the bus coupler.

A terminal winding 45 is wound on a cross-member 42c of U-shaped core element 42, with terminal winding leads 46 and 47 being coupled to a twisted wire pair in a terminal stub 48 of a respective terminal. In this manner, a respective terminal can be inductively coupled by means of terminal stub 48, terminal winding 45 and bus coupler 40 to the bus medium of the current mode data bus. This procedure can be used to inductively couple an arbitrary number of terminals to the bus medium (twisted wire pair 10). Both wires of twisted wire pair 10 participate in every coupler so that every terminal on the current mode data bus has access to the data bus medium, and consequently to every other terminal by means of the twisted wire pair current loop. Of course, any terminal can be decoupled from the current mode data bus by merely disassembling the associated U-I core of a respective bus coupler and withdrawing legs 42a and 42b of the U-shaped core element 42 from twisted wire pair 10.

FIG. 2a does not show the protective potting and/or jacketing which would conventionally enclose bus coupler 40. Nor does it indicate a grounded metallic shielding which is recommended to reduce the effect of lightning or other electromagnetic interference on the current mode data bus by providing an eddy current medium for magnetic interference and a path to ground for static interference. Nor does it show a means for clamping the two separable core elements (I-shaped core element 41 and U-shaped core element 42) together. Although any suitable clamping arrangement which preserves the separability of the core elements can be employed, FIG. 2b indicates a preferred embodiment of a clamping method for a bus coupler 70 with a U-I core configuration. FIG. 2b indicates the molded jacket surrounding a potted, I-shaped core element 71 together with the molded jacket surrounding a potted, U-shaped core element 72. (An outer metallic shielding which would surround this U-I core is not shown.) Flanges 71a and 71b extend outwardly from I-shaped core element 71 while flanges 72a and 72b extend outwardly from U-shaped core element 72. A bolt 73a is extended through corresponding holes in flanges 71a and 72a and through a retaining nut 74a. Similarly, a bolt 73b is extended through corresponding holes in flanges 71b and 72b and through a retaining nut 74b. By tightening retaining nuts 74a and 74b onto respective bolts 73a and 73b, I-shaped core element 71 can be clamped to U-shaped core element 72 with the moderate force necessary to ensure continuous contact between the core elements. (The contact surfaces of the separable core elements can be lapped to minimize any low permeability air gaps between the core elements.)

In a data communication system utilizing the current mode data bus according to the present invention, each bus coupler associated with a particular terminal appears on the twisted wire pair bus medium in a series configuration as depicted schematically in FIG. 1. Those loops of the twisted wire pair which constitute the core windings for the bus couplers introduce series inductive impedances on the bus medium. Thus, for a data communication system with a number of participating terminals coupled together by means of a current mode data bus, the voltage measured at the terminal windings of those terminals receiving data are much less than the drive voltage applied to the terminal winding of a transmitting terminal. This voltage level discrepancy can be accommodated, and the same bus coupler used for transmission and reception, by increasing the transmission drive voltage of each terminal.

Alternatively, in the interest of using similar type integrated circuits and supply voltages for both the reception and transmission portions of each terminal, a bus coupler can employ two electrically separate terminal windings, one with a higher number of turns for reception and the other with many fewer turns for transmission. Such an arrangement also reduces space and cost requirements, and keeps the series inductance of the bus medium at a minimum. Accordingly, a preferred embodiment of the current mode data bus utilizes a single bus coupler for each terminal with electrically separate terminal windings for transmission and reception, both placed on the same core. Thus, in FIG. 2c, bus coupler 40 includes a reception terminal winding with terminals 46a and 46b and a transmission terminal winding of many fewer turns with terminals 47a and 47b wound on top of the reception terminal winding. In this embodiment, the terminal stub (between bus coupler 40 and the associated terminal, not shown) comprises two twisted wire pairs within a shielded jacket.

The bus medium (twisted wire pair 10) of the current mode data bus can be fabricated from commercially available insulated wires terminated in simple, short-circuit splices 16 and 18 at each end, and twisted as desired to accommodate inductive coupling to the bus medium. In a preferred embodiment, twisted wire pair 10 is twisted along its entire length, with approximately one twist per inch. As discussed more fully below, this full-length twisting keeps the wires (12 and 14) of the twisted wire pair in close proximity to each other to reduce the effect of electromagnetic interference on the current mode data bus. A thick, high voltage and abrasion resistant insulation can be specified to improve electrical properties and durability.

In a preferred embodiment, the bus couplers are fabricated from ferrite core elements of the general chemical formula $X Fe_2O_4$, where X is a metallic ion such as manganese, zinc, cobalt or nickel. These ferrite materials can be readily formed into the desired core element shape and exhibit excellent magnetic permeability and extremely high ohmic properties, even at the high frequencies conventionally used in data communication. With the addition of a secure and durable terminal winding and terminal stub, together with protective potting, jacketing and shielding, an extremely durable and dependable bus coupler can be provided at a reasonable cost.

As noted above, since no galvanic connections ever need be made to the conductors of the bus medium (twisted wire pair 10) of the current mode data bus, extreme reliability claims can be made for this element. The operation of this bus medium is insensitive to the operational status (active, inactive or removed from the system) of any of the participating terminals or bus couplers. For instance, a short circuit on a terminal winding reduces the inductance presented by the associated bus coupler to the bus medium. The effect on the bus medium is the same as that of removing the bus coupler from the current mode data bus. The same effect is caused by a broken core element in the bus coupler. On the other hand, an open terminal winding or a severed terminal stub results in the bus coupler inductance being at some maximum impedance level. This maximum value of inductive impedance is the same for each of the bus couplers associated with the several terminals and translates into a terminal design load for the transmission portion of each terminal.

The current mode data bus according to the present invention, comprised of a twisted wire pair bus medium together with a bus coupler for each of the terminals, exhibits excellent electromagnetic compatibility characteristics, i.e., the operation of the current mode data bus does not affect other electrical or electronic equipment, nor is it affected by such equipment or by radiation, inductive or capacitive coupling. In addition, in an aviation context, it has the capability to withstand moderate to heavy lightning strikes. The data bus medium comprises a balanced, twisted wire pair which is electrically floating and covered by uninterrupted high voltage insulation over the full length of the bus medium. Since the twisted wire pair which forms the bus medium is terminated at both ends by a short-circuit splice, a closed current loop is formed with no current paths to ground, and hence no potential to convert common mode voltages into differential ones. By reason of the twisting configuration of the bus medium and the resulting close proximity of the wires (16 and 18) of twisted wire pair 10, any stray magnetic fields induce common mode currents which cancel each other on the bus medium itself, without being transmitted to the terminals. Where the coupling of a bus coupler separates the wires of the twisted wire pair, making the bus medium more susceptible to electromagnetic interference, the grounded metallic shielding of the bus coupler can, as noted above, reduce its effect.

Incorporating the current mode data bus according to the present invention into a network for data communication among a plurality of terminals involves certain design considerations with respect to the inherent transient response of the current mode data bus. Specifically, because of the finite speed of electricity within the current loop formed by the bus medium (the twisted wire pair), a finite time period elapses between the time a transmitting terminal inductively couples a data signal into the bus medium and the time at which a steady-state signal is attained therein. For example, consider a bus medium of a maximum length of three hundred feet, as one might expect in the case of an avionic application of the current mode data bus. Now, assume a data communication system based on a Manchester bi-phase level data transmission at a bit rate of one hundred kilocycles (for a half-cycle period of five microseconds). For the worst-case example of a transmitting terminal and a receiving terminal which are in close proximity to each other on the bus medium, each five microsecond data pulse is initially distorted for approximately 0.6 microseconds, the time it takes for the signal in the bus medium to reach a steady-state value. Thus, the waveform received by the receiving terminal is distorted for slightly more than one-tenth of the period of each (half cycle) data bit. Those skilled in the art will recognize this degree of waveform distortion as being well within conventional sampling or other appropriate detection techniques; therefore, this transient distortion should not affect the accuracy of data communication along the current mode data bus.

Figure 4:
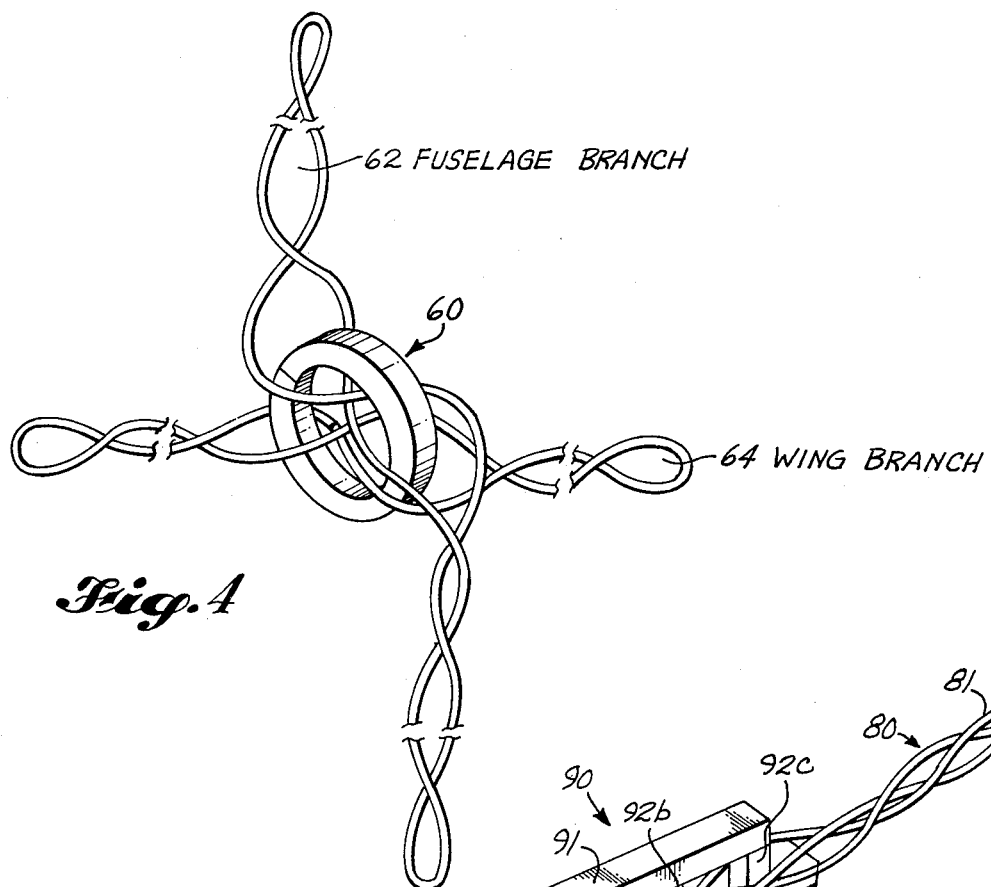
FIg. 4 shows two separate, twisted wire pair branches inductively coupled in accordance with the present invention.

The current mode data bus according to the present invention is readily adaptible to branching bus architecture, such as is particularly relevant in the aircraft industry. For instance, consider the use of a data bus for the flight control system in an airplane. The data bus medium must reach remote terminal subsystems that are located along two major expanses, the wings and the fuselage. Routing a data bus, even a single current mode data bus, to all of these remote terminals would result in an excessive length of the bus medium. FIG. 4 schematically indicates a solution to this problem which is an extension of the basic concept of the current mode data bus. A separable coupling core 60 is used to inductively couple two separate bus mediums, a twisted wire pair 62 indicated as the fuselage branch and a twisted wire pair 64 indicated as the wing branch.

Figure 3:
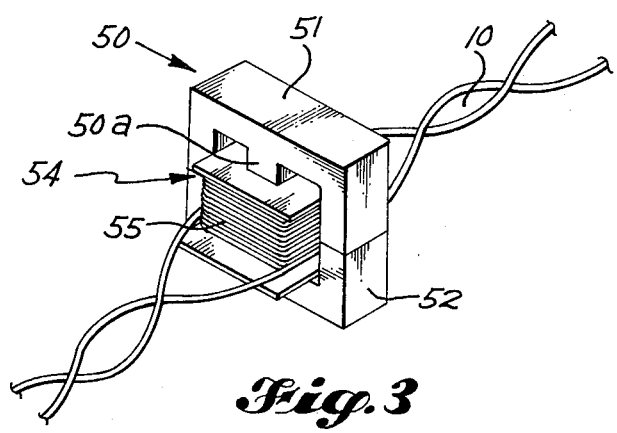
FIG. 3 shows an E—E configuration transformer coupler coupled to the twisted wire pair.

In an alternate embodiment of the current mode data bus according to the present invention, the bus couplers are formed from two separable E-shaped core elements. Referring to FIG. 3, bus coupler 50 comprises an E—E core consisting of E-shaped core elements 51 and 51. In the alternate embodiment shown, a terminal winding 55 is wound about a winding bobbin 54 which is disposed on a center leg 50a formed from corresponding center legs of the E-shaped core elements 51 and 52. To assemble bus coupler 50 with twisted wire pair 10, winding bobbin 54 carrying terminal winding 55 is inserted through a loop in the twisted wire pair. The E-shaped core elements 51, 52 are then assembled with center leg 50a extending through winding bobbin 54. Here again, conventional protective potting, jacketing and shielding and clamping means are not shown. In this alternate embodiment, each wire of twisted wire pair 10 constitutes a one-half turn winding about the E—E core of bus coupler 50, for an equivalent one-turning winding.

Figure 5:
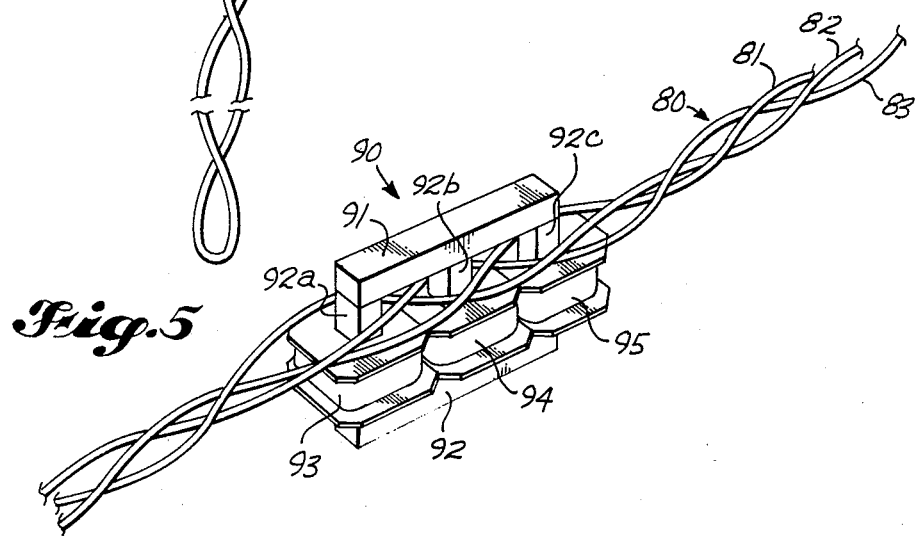
FIG. 5 is of an alternate embodiment of the present invention using a twisted wire triplet together with an E-I configuration transformer coupler for three-phase operation.
Figure 6:
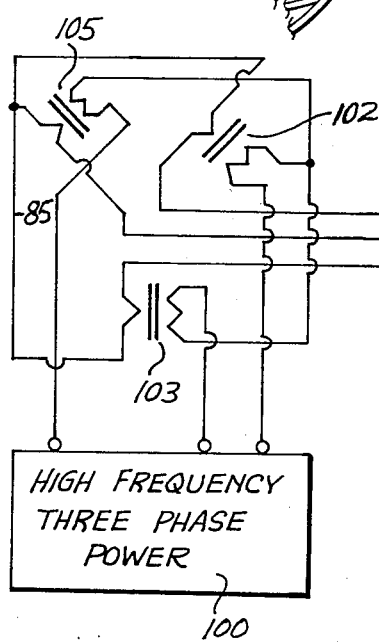
FIG. 6 is a schematic circuit diagram of a three-phase power distribution bus in accordance with the principles of the present invention.

The concept of the current mode data bus according to the present invention can be readily extended to single and multiple phase power transmission. FIG. 5 shows a current mode power bus for a three-phase power distribution system. The bus medium is comprised of a twisted wire triplet 80 comprises of three wires 81, 82 and 83. A three-phase bus coupler 90 is indicated as comprising an E-I core with an I-shaped core element 91 and an E-shaped core element 92. Bus coupler 90 is inductively coupled to twisted wire triplet 80 with the three core legs 92a, 92b and 92c of E-shaped core element 92 extending through adjacent loops of the twisted wire triplet. Three-phase power coupling windings 93, 94 and 95 are disposed around, respectively, core legs 92a, 92b and 92c. A schematic diagram of a three-phase power distribution system employing this current mode power bus concept appears in FIG. 6. Twisted wire triplet 80, the bus medium, ends in short-circuit terminations 85 and 86. A three-phase power source 100 provides three-phase power which is coupled onto the twisted wire triplet by means of a three-phase bus coupler indicated schematically at 102, 103 and 104. A power receiving terminal 120 receives power from the bus medium by means of a three-phase bus coupler (indicated schematically at 110). Such a three-phase power distribution system would preferably include constant current control in the power source to accommodate a change in the number of power receiving terminals by maintaining a constant current in the bus medium, and to limit the current value in the bus medium in the event all power receiving terminals are decoupled.

Obviously, other embodiments and modifications of the present invention will readily come to those of ordinary skill in the art having the benefit of the teachings presented in the foregoing description and the drawings. It is therefore to be understood that this invention is not to be construed as limited thereto and that said modifications and embodiments are intended to be included within the scope of the appended claims.

The embodiments of the invention in which an exclusive property or privilege is claimed are defined as follows:

1. A current mode transmission system for communicating among two or more terminals, comprising:
   a bus medium consisting of a plurality of wires of substantially the same length insulated from each other and short-circuited together at both ends, said plurality of wires being twisted along their lengths to form a plurality of loops; and,
   a plurality of bus couplers, at least one of said plurality of bus couplers being associated with each one of said terminals, each of said plurality of bus couplers including:
   first and second, separable core elements, at least said first core element being adapted to be inserted into said bus medium at a desired location therein so that said twisted plurality of wires forms, at said desired location, at least one loop around said first core element, said first core element being further adapted to be assembled with said second core element when so inserted into said bus medium; and,
   at least one terminal winding carried by one of said first and second core elements for inductively coupling said bus coupler with said associated one of said terminals.

2. The transmission system defined in claim 1 wherein said bus medium consists of a twisted pair of wires.

3. The transmission system defined in claim 2 wherein said first core element comprises a U-shaped core element and said second core element comprises a l-shaped core element, said U-shaped core element being adapted to be inserted into said bus medium so that the legs of said U-shaped core element extend through adjacent loops of said twisted pair of wires, whereby said adjacent loops form a two-turn winding on said U-shaped core element.

4. The transmission system defined in claim 3 wherein said first and second core elements each comprise an E-shaped core element, one of said E-shaped core elements being adapted to be inserted into said bus medium so that at least one of the legs of said one E-shaped core element extends through one of the loops of said twisted pair of wires, whereby said loop forms a one-turn winding on said one E-shaped core element.

5. The transmission system defined in claim 1 wherein said bus medium consists of a twisted triplet of first, second and third wires.

6. The transmission system defined in claim 5 wherein said first core element includes first, second and third legs, said first core element being adapted to be inserted into bus medium so that said first and second wires form a loop around said first leg, said first and third wires form a loop around said second leg, and said second and third wires form a loop around said third leg, whereby said transmission system can be adapted to three-phase power transmission between said terminals.

7. The transmission system defined in claim 6 wherein said first core element comprises an E-shaped core element and said second core element comprises an I-shaped core element.

8. The transmission system defined in claim 1 wherein each of said plurality of bus couplers includes first and second, electrically separate terminal windings, each carried by one of said first and second core elements, said first terminal winding being adapted to inductively couple said bus coupler to a receiving portion of said associated terminal and said second terminal winding having a substantially fewer number of turns than said first terminal winding and being adapted to inductively couple a transmitting portion of said associated terminal to said bus coupler.

* * * * *